United States Patent [19]

Coushaine

[11] Patent Number: 5,437,409
[45] Date of Patent: Aug. 1, 1995

[54] PIVOTING MAILBOX APPARATUS

[76] Inventor: Charles M. Coushaine, 56 Birch Dr., Rindge, N.H. 03461

[21] Appl. No.: 229,901

[22] Filed: Apr. 19, 1994

[51] Int. Cl.⁶ ............... B65D 91/00; F16M 13/00
[52] U.S. Cl. .................................. 232/39; 248/900
[58] Field of Search .......... 232/38, 39, 17; 40/607; 248/131, 900

[56] References Cited

U.S. PATENT DOCUMENTS

| | | | |
|---|---|---|---|
| 839,607 | 12/1906 | Lanier | 232/39 |
| 1,240,190 | 9/1917 | Forth | 248/131 |
| 1,240,429 | 5/1920 | O'Shei | 248/900 |
| 1,616,432 | 2/1927 | Aarseth | 248/131 |
| 2,193,378 | 3/1940 | Popp | 232/39 |
| 2,669,408 | 2/1954 | Cox | 232/39 |
| 3,870,262 | 3/1975 | Manning, Jr. | 248/145 |
| 3,899,150 | 8/1975 | Racquet | 248/145 |
| 4,130,239 | 12/1978 | Belsheim | 232/39 |
| 4,172,579 | 10/1979 | Steinman | 248/145 |
| 4,187,645 | 2/1980 | Dowker | 232/39 |
| 4,616,799 | 10/1986 | Rebentish | 248/900 |
| 4,667,918 | 5/1987 | Page | 248/418 |
| 4,893,747 | 1/1990 | Roth | 232/39 |
| 4,995,576 | 2/1993 | Kieswetter | 248/145 |
| 5,167,364 | 12/1992 | Wenning | 232/39 |

*Primary Examiner*—Flemming Saether
*Attorney, Agent, or Firm*—William B. Ritchie

[57] ABSTRACT

A decorative pivoting mailbox assembly for road-side use which is less susceptible to damage from snow plows or automobiles. The assembly is attached to any standard vertical mailbox post and forms a platform for attaching the mailbox. Once the mailbox is attached, the invention acts as a self-centering hinge which allows the mailbox to swing in excess of 90 degrees from its original position to either side. It then returns via a spring, gravity and inherent hinge design to its original position. At all times, the mailbox is kept in a horizontal attitude and does not tilt. This invention allows the mailbox to be cantilevered out over the street to assist in mail insertion yet allows the homeowner to swing it sideways and empty the contents without venturing into the street and traffic.

13 Claims, 7 Drawing Sheets

PIVOTING MAILBOX APPARATUS

BACKGROUND OF THE INVENTION

1. Field of the Invention

The invention relates to rural mailboxes, particularly support apparatus that make the mailbox resistant to damage by being struck by a snow plow, car or truck.

2. Description of the Related Art

Urban mailbox posts have long since been a source of constant maintenance and damage repair. If proper upkeep is not provided, the result is often rather unsightly.

The greatest potential damage to a mailbox comes from a snow plow moving down the street at a moderate to high rate of speed. Attempting to do the best job possible of clearing the street, the plow gets as close to the edge of the road without hitting the mailboxes. Even if the snow plow operator misses the mailbox, the snow trailing off the plow blade has been known to completely destroy even the sturdiest mailbox posts.

U.S. Post Office specifications require that the mailbox extend to the road, so that the mail carrier can deliver the mail without leaving his/her vehicle. To remove the mail, the homeowner must stand in the street, putting the person close or in the actual path of traffic. The first sign or sound of approaching traffic usually results in the prudent person moving toward the curb.

Roadside mailbox supports come in an wide variety of designs. These range from the basic 4×4 post support to elaborate decorative designs.

The most basic of these designs uses a 4×4 inch wooden post with its members lap jointed together. This design is rigid and has been weakened by the lap joint construction. The half lap joint that locks the two pieces together actually removes about half the wood and, correspondingly, half the holding strength. The original 4×4 post is now actually 2×4 at this joint. This joint is where all the force is exerted when struck by an automobile or plow. Almost always, the support fails at this location and is a complete loss.

Numerous attempts have made to achieve crash protection for mailbox supports.

U.S. Pat. No. 3,870,262, issued to Manning, Jr. on Mar. 11, 1975, discloses a mailbox support that pivots when struck by a vehicle. However, the mailbox and its support bar slip from its bearing supports and fall to the ground along the edge or in the roadway. Once laying on the ground, it is subject to additional damage, can be easily moved substantial distances or be lost in the snow.

U.S. Pat. No. 4,187,978, issued to Dowker on Feb. 12, 1980, discloses another pivoting mailbox that is held by a shear pin. Once the mailbox is struck, the pin is sheared and the box is freed to pivot. This pin can only be sheared one time and then must be replaced. At this point the mailbox assembly is unusable.

U.S. Pat. No. 4,667,918, issued to Page on May 26, 1987, and U.S. Pat. No. 4,893,747, issued to Roth on Jan. 16, 1990, both disclose mailbox supports that allow the mailbox to rotate but first a pin or latch has to be activated. While these designs permit the homeowner to access the mail in the box without entering the street, they do not protect the mailbox from impacts from cars or snowplows.

U.S. Pat. No. 4,130,239, issued to Belsheim on Dec. 19, 1988, and U.S. Pat. No. 4,995,576, issued to Kieswetter on Feb. 26, 1991, both disclose similar pivoting actuation when struck from the side. Both discloses the use of a pipe inside a pipe at an angle to give the mailbox assembly a pivot to spin around. The angle of the pivot pipe uses the uncertainty of gravity alone to attempt to return the mailbox to its original position. Also, wind could cause the mailbox to sway in an unsightly manner. The mailbox also must leave its horizontal orientation and raise upwards at an angle as it rotates through a possible full circle. The speed of pivoting is a function of the force striking the mailbox. Gravity is the only restoring force that places the mailbox back into position once struck.

U.S. Pat. No. 3,899,150, issued to Racquet on Aug. 12, 1975, discloses the use of a long torsion spring inside a round pipe support that is said to yield to a sideward load and then return the mailbox to its original position. Frictional variations due to the introduction of water, salt or sand into the mechanism could affect the return position and result in the return position being different that the original position.

U.S. Pat. No. 5,167,364, issued to Wenning on Dec. 1, 1992, discloses the use of an internally grooved cam slot to allow the mailbox to rotate about the mailbox post. This design requires a round pipe to fit snugly within a square metal tube. Also, bearings would be necessary to assure a smooth and consistent rotatable motion. Further, cutting the complex three-dimensional curved cam path around the internal pipe is difficult. This results in this apparatus being expensive to manufacture.

U.S. Pat. No. 4,172,579, issued to Steinman on Oct. 30, 1979, discloses a spring-detent design which retains the mailbox support in either the normal "facing the road" position or 90 degrees left or right of that position. Once the mailbox is dislodged, the homeowner must manually correct the position. This design also allows the assembly to be rotated 360 degrees and stop anywhere during its rotation. Friction between the surfaces in contact would have a great impact on performance, thus susceptible to being adversely effected by salt and sand. Also, the design permits the mailbox to swing upwards.

A mailbox support that is virtually maintenance free, enables the homeowner to turn the mailbox sidewise to retrieve the mail, pivots when struck yet returns automatically to its original position with a minimum of vertical motion and is inexpensive to manufacture, is not found in the prior art.

SUMMARY OF THE INVENTION

It is an object of the invention to provide a pivoting mailbox assembly that is durable with its performance relatively independent of water, salt and sand.

Another object of the invention is to provide a pivoting mailbox assembly that is economical to manufacture.

It is still another object of the invention to provide a pivoting mailbox assembly that can be produced in a number of attractive designs.

Another object of the invention is to provide a pivoting mailbox assembly that allows the homeowner to empty the contents of the mailbox without entering the street.

Another object of the invention is to provide a pivoting mailbox assembly that pivots when struck from the side and then returns to its original position.

It is an object of the invention to provide a pivoting mailbox assembly that does not require maintenance of the pivoting mechanism from the effects of salt, sand and water.

Another object of the invention is to provide a pivoting mailbox assembly that maintains the mailbox in a substantially horizontal position, even when it pivots.

Still another object of the invention is to provide a pivoting mailbox assembly that, when struck, returns to its original position in a slow controlled motion.

It is another object of the invention to provide a pivoting mailbox assembly that feature different aesthetic designs without compromising the functionality of the support mechanism.

Another object of the invention is to provide a pivoting mailbox assembly having a rigid vertical plane through the support mechanism that allows the mailbox to carry a standard load.

It is another object of the invention to provide a pivoting mailbox assembly which is not easily dismantled or damaged by vandals.

It is a final object of the invention to provide a pivoting mailbox assembly that meets all United States Post Office regulations and guidelines.

The invention is a pivoting apparatus for attaching a mailbox to a post. A box support section having at least two attachment mailbox mounting flanges that attach said support section to the mailbox is provided. The box support section also has a top portion having a compound angled surface and a bottom portion, with said top and bottom portions having an opening. A post bracket is provided that attaches to the post. The post bracket has a top portion having a compound angled surface and a bottom portion, with said top and bottom portions having an opening. The compound angle of said top portion of said box support section corresponds to the compound angle of said top portion of said post bracket. The compound angle comprises a return angle and a speed angle. The preferred return angle of the post bracket is 12 degrees and the preferred speed angle of the post bracket is 30 degrees. A shaft having a diameter corresponding to the openings in said top and bottom portions of said box support section and corresponding to the openings in said top and bottom portions of said post bracket is provided. The shaft pivotally connects the box support section to the post bracket through the openings in said top and bottom portions of said post bracket and said box support section such the compound angled surfaces of said post bracket and said box support section are adjacent to one another. A lateral force against the box support section will cause the box support to pivot on said shaft by riding up the compound angled surface of said post bracket.

DETAILED DESCRIPTION OF THE INVENTION

Figure 1:
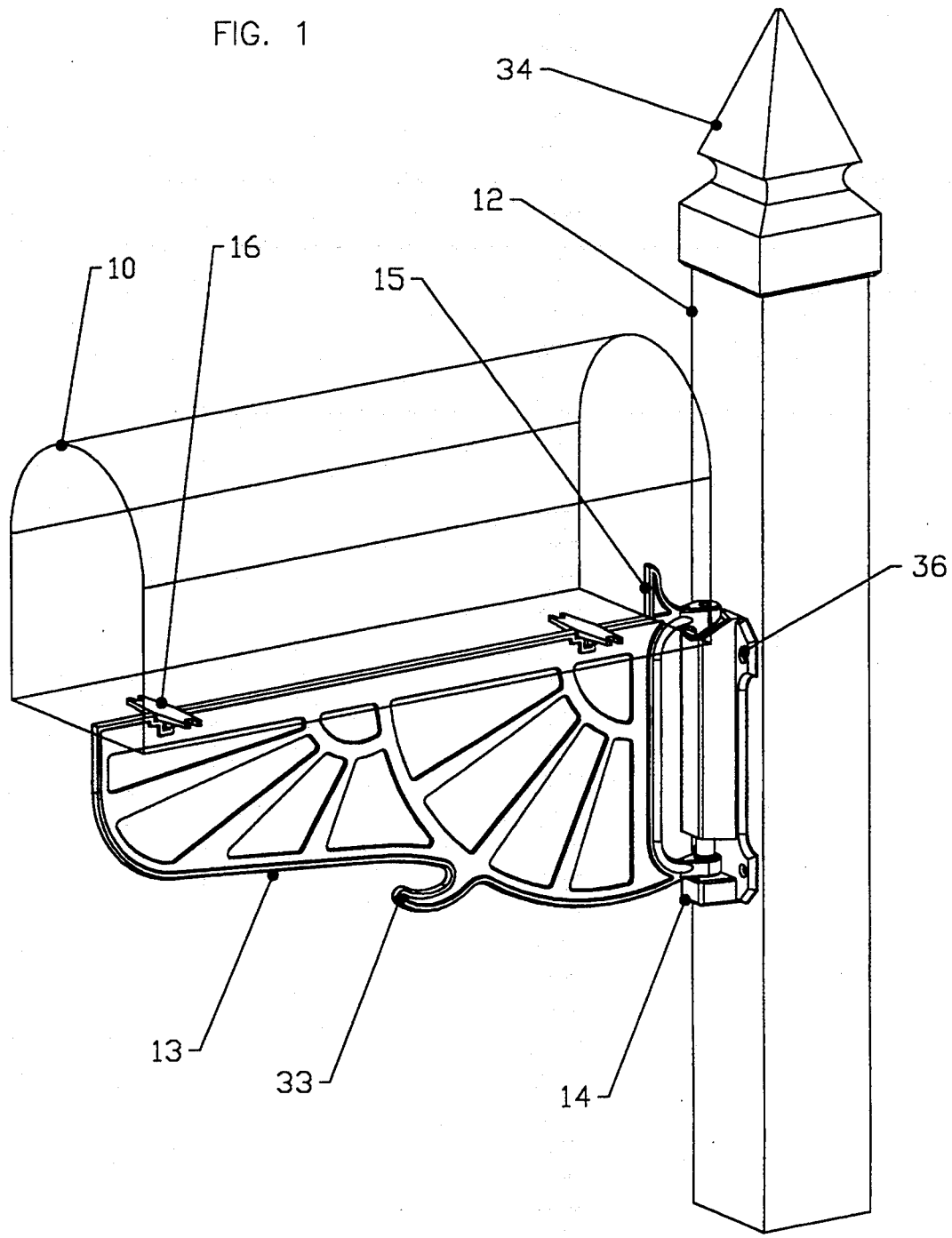
FIG. 1 is an isometric side elevation view of the support in its normal resting position.

FIG. 1 is an isometric side elevation of the pivoting mailbox assembly in accordance with the invention. Box support 13 and a post bracket 14 are preferably castings yet could also be made out of several components machined and screwed together. Support 13 and bracket 14 are attached to a standard mailbox post 12 with screws or bolts (not shown) through holes 36. When attached to post 12, box support 13 and bracket 14 form a 90 degree platform for any size mailbox 10 to be supported thereon. Mailbox 10 is attached to box support 13 through four screws or bolts on its top edge where the mounting flanges 16 protrude. Mailbox 10 is slid all the way back until it hits the stop support 15 which keeps the mailbox 10 from hitting post 12 when it pivots from side to side. On top of the mailbox post 12 is shown an optional decorative post cap 34 which dresses up the design. As shown, bracket 33 can be ornately designed so that each homeowner would be able to have a distinctive look. Paper hook 33 can be cast right into box support 13. Hook 33 is used to hold a newspaper or other items that, by law, cannot be placed in the owner's mailbox.

Figure 2:
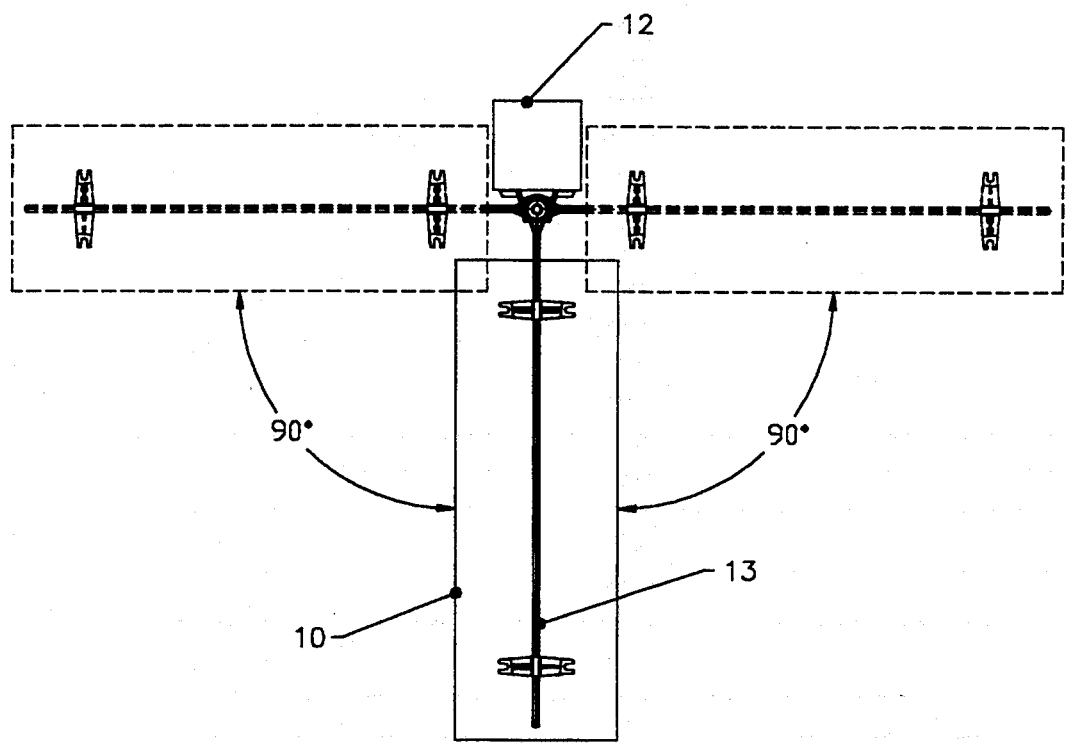
FIG. 2 is a bottom view of the support showing it in its normal position and pivoted position to either side.

FIG. 2 is a bottom view of the mailbox 10 and box support 13 in its normal rest position and both pivoted positions to the left and right. Mailbox 10 can pivot at least 90 degrees either way without hitting the mailbox post 12.

Figure 3:
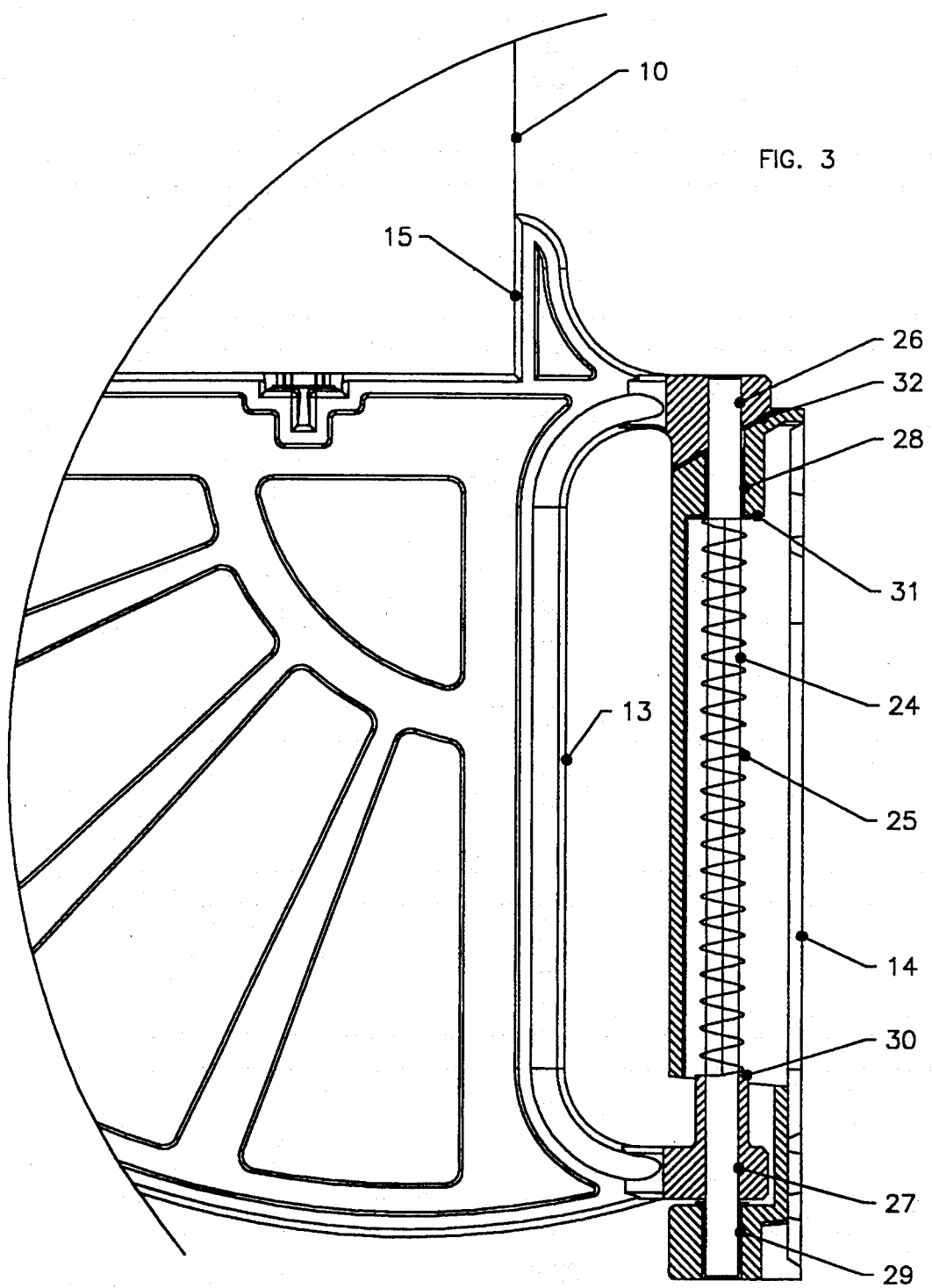
FIG. 3 is a cross section of the support showing its internal components.

FIG. 3 is a detailed partial cross-sectional view showing the pivoting mechanism of the pivoting mailbox assembly. Box support 13 is attached to post bracket 14 via shaft 24. Shaft 24 is inserted up from the bottom through a nylon type flange bearing 29, through a slip fit in the box support 13 at interface 27, through spring 25, sized in accordance with the diameter of shaft 24, through another nylon type flange bearing 28, through a nylon type self-conforming thrust washer 32, and finally pressed into the top of the box support 13 at interface 26. Spring 25 keeps a downward thrust of box support 13 to the post bracket 14 through the thrust washer 32 and also holds the flange bearing 28 in place. The angle of thrust washer 32 is 12° out, 30° back toward post 14 as is discussed later. All three nylon type bearings are commercially available (BRGS 28 & 29, Thompson Nyliner #5LIO-F, and BRG 32 nylon flat washer - Micro Plastics #17W11211) and are virtually maintenance free. They require no oiling, have excellent slip characteristics (low coefficient of friction), are very stable in extreme temperature conditions and have high abrasion resistance. In an outdoor application like this, most bearings would react negatively to changes of temperatures, humidity and salty road spray conditions. Also, nylon type bearings 29, 28, and 32 along with the shaft 24 and spring 25 are all very well protected from the elements because the are completely hidden from view inside a formed cavity in the post bracket 14. All these factors combined provide a very durable, long lasting, maintenance free pivot mechanism.

An alternate assembly procedure would be to install the shaft 24 down from the top and have interface 26 of the box support 13 be a slip fit. The rest of the assembly would be the same with the exception that the top end of the shaft 24 would be flared or knurled to form an interference fit when it contacted the top hole 22 of the box support at interface 26. This would hold the assembly together exactly the same way and its performance would be unaffected.

Figure 4:
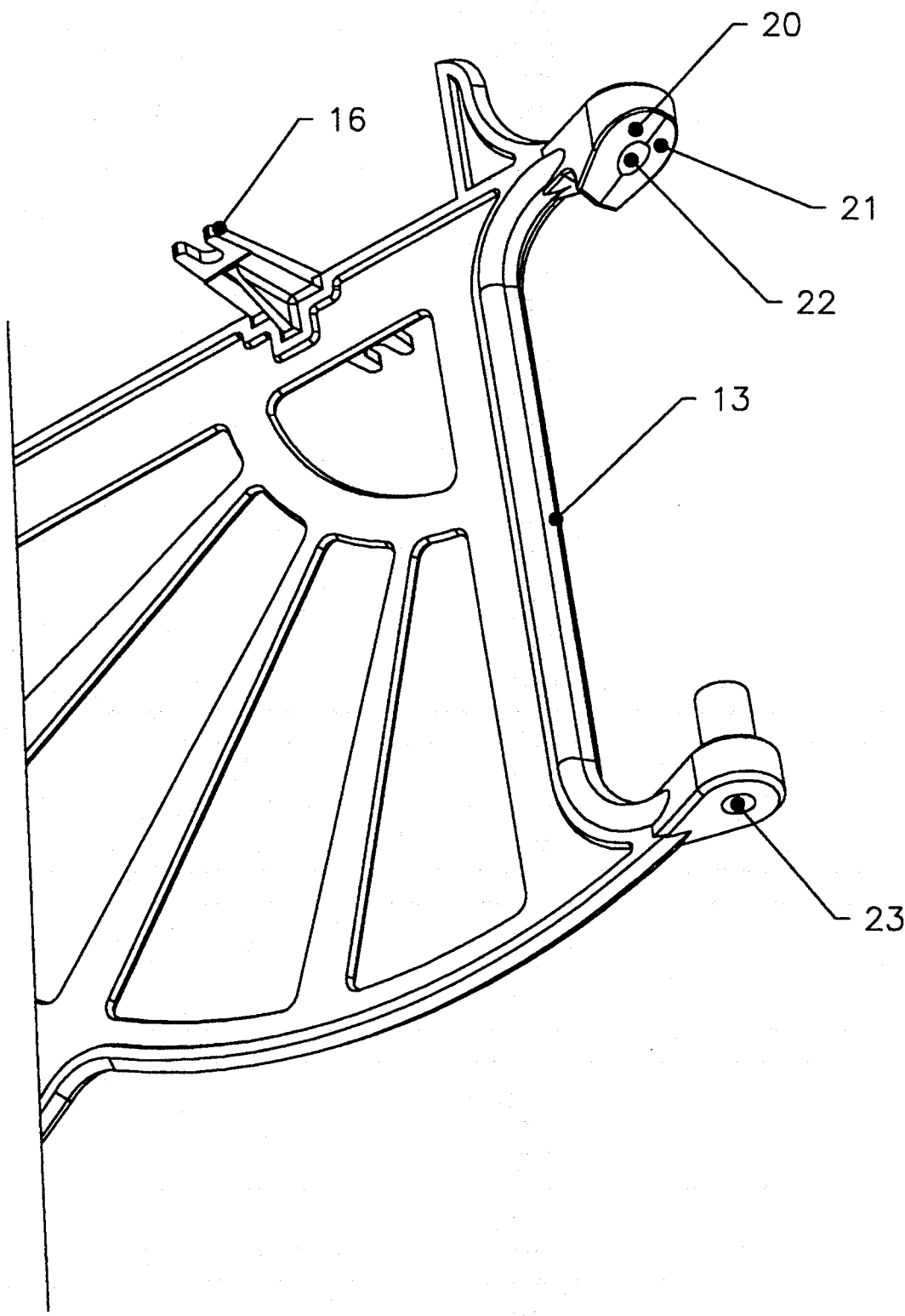
FIG. 4 is an isometric view of the box support.
Figure 5:
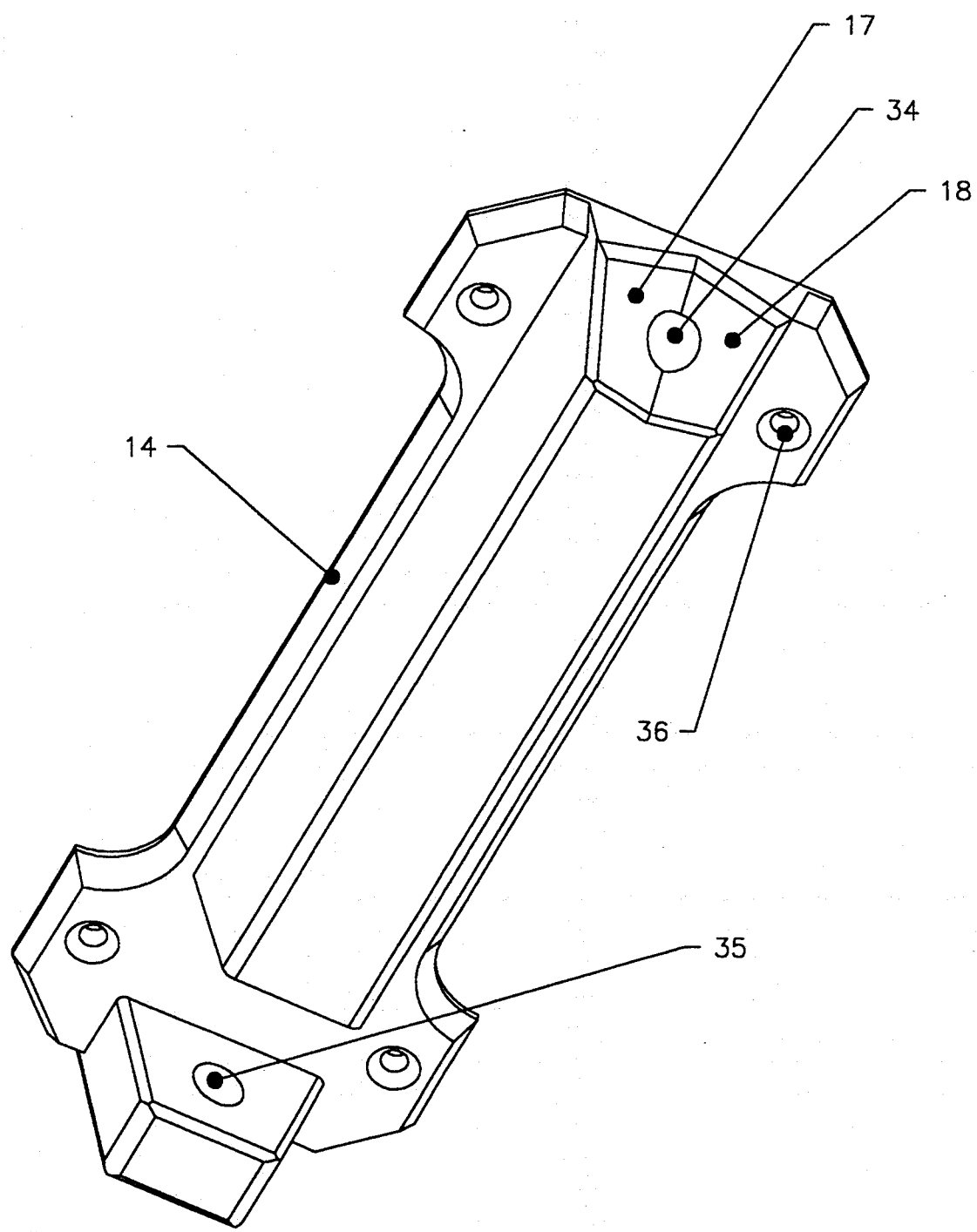
FIG. 5 is an isometric view of the post bracket.

When mailbox 10 or box support 13 has a sideward or lateral force exerted on it, surface 20 or 21 (as shown in FIG. 4), depending on whether the sideward force pushes support left or right, rides up on surface 17 or 18 (as shown in FIG. 5) depending on which side the assembly pivots toward. Note that these surfaces have the nylon type self conforming thrust bearing 32 between them to provide a very slippery surface. Thrust bearing 32 is preferably a simple disc that is thin enough to conform to these surfaces under very little pressure. The weight of the mailbox 10 and box support 13 is sufficient to cause bearing 32 to conform to these surfaces without relying on the spring force. The compound angles are preferably 12° out, 30° back toward post 14, cast into both the box support 13 and the post bracket 14 are identical and match when in the rest position. This causes the mailbox 10 and box support 13 to slide down the incline and return to rest at its starting point. When at rest at its starting point, surfaces 20 & 18 and 21 & 17 fit together perfectly with only the nylon type thrust bearing 32 between them. A completely flat angle, compared to this compound angle, would not bring the assembly back to its original position. Steeper angles, or too steep an angle, would create too much bending on the shaft 24, increase the force needed to pivot the assembly, and also make the mailbox 10 move a greater vertical distance which would be undesirable. Spring 25 causes the assembly to stay in its rest position. Without spring 25, a strong wind could cause the assembly to sway in the breeze with these slippery bearings.

As the assembly pivots, shaft 24, which is pressed fit into the box support 13 at interface 26, rises vertically and moves up in bearing 29. This slight raising up of box support 13, approximately ½ inch, compresses the spring as surface 30 of box support 13 gets closer to the flange of bearing 28 at surface 31. A simple compression spring deflected approximately 1" initially when in the rest position, exerts a force of 15 lbs between surfaces 30 & 31. When pivoted 90°, spring 25 deflects an additional ½" which is very minor compared to the overall spring length so the influence on the force required to pivot the assembly is minimal, yet, is sufficient to ensure that the original position of the box support 13 is maintained once the sideward force is removed.

Referring again to FIG. 3, mailbox 10 is shown pushed up against stop support 15. The distance from the edge of stop support 15 to the centerline of the shaft 24 is governed by support post 12. This distance is just greater than ½ the standard 4×4 inch post width. This allows the back corner of the mailbox 10 to clear the support post 12 as also shown in FIG. 2. If a homeowner has a larger post width, then the mailbox 10 should be slid a little bit farther away from the stop support 15. This is preferably accomplished by placing a shim (not shown) between stop support 15 and mailbox 10.

FIG. 4 shows the compound angle surfaces 20 and 21 (12° out, 30° back toward post 14) and also shows a close up view of the cast-in mounting flanges 16. Mailbox 10 sits on flanges 16 and screws through the slots hold it down (note: a piece of wood is usually placed in between the mailbox 10 and the mounting flanges 16 so the screws do not protrude inside the mailbox 10). FIG. 4 also shows where shaft 24 has a slip fit through hole 23 but is a press fit into hole 22 of the box support 13.

FIG. 5 shows the compound angle surfaces 17 and 18 and the four mounting holes 36 cast into the post bracket 14. Both holes 34 and 35 are made to accept the nylon type flange bearings.

Figure 6:
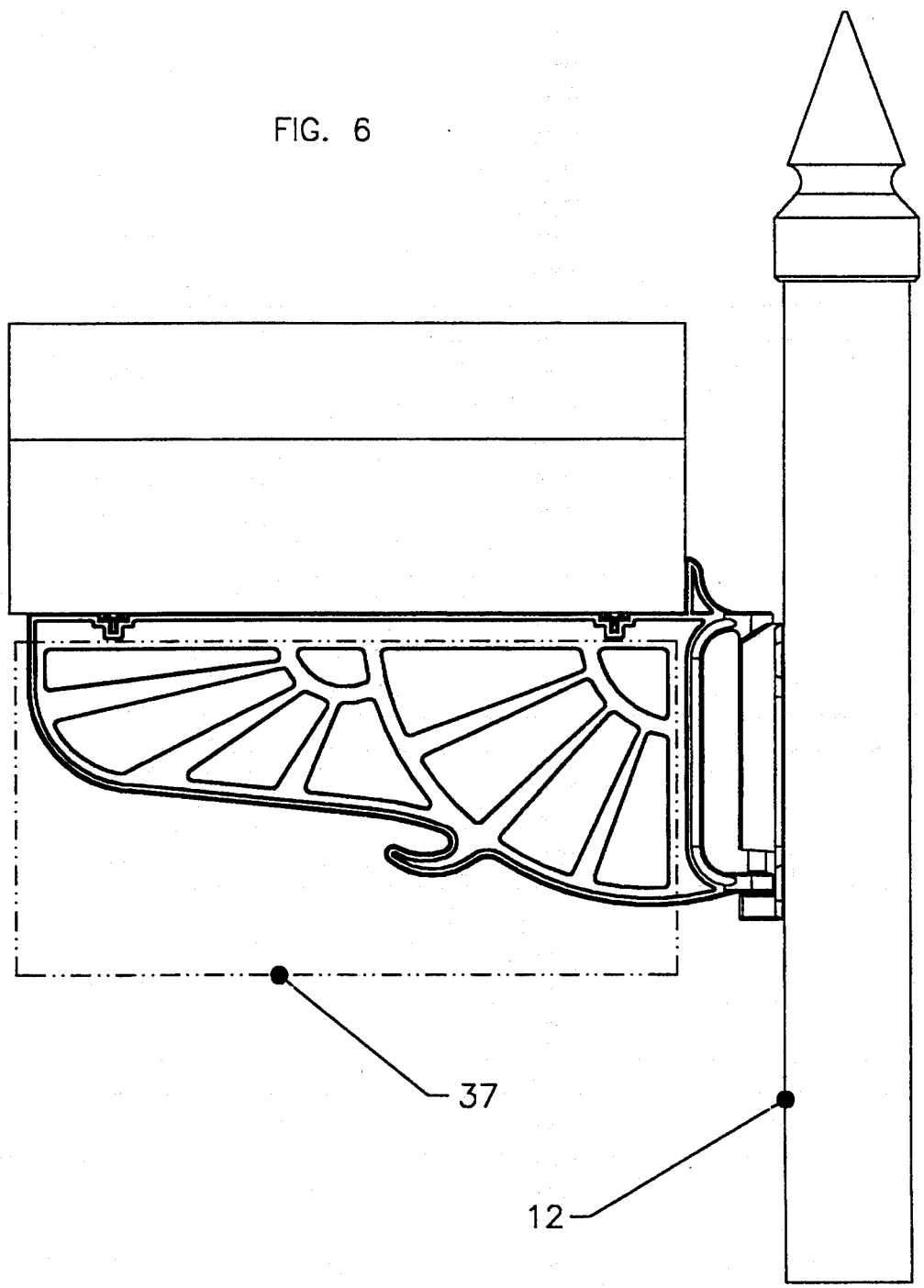
FIG. 6 is a side elevation of the support.

FIG. 6 is a side elevation of the pivoting mailbox assembly attached to post 12. The design shown in the dotted-dashed box 37 is just one of countless aesthetic designs that could be incorporated into box support 13 without altering the functioning of this element of the invention.

Figure 7:
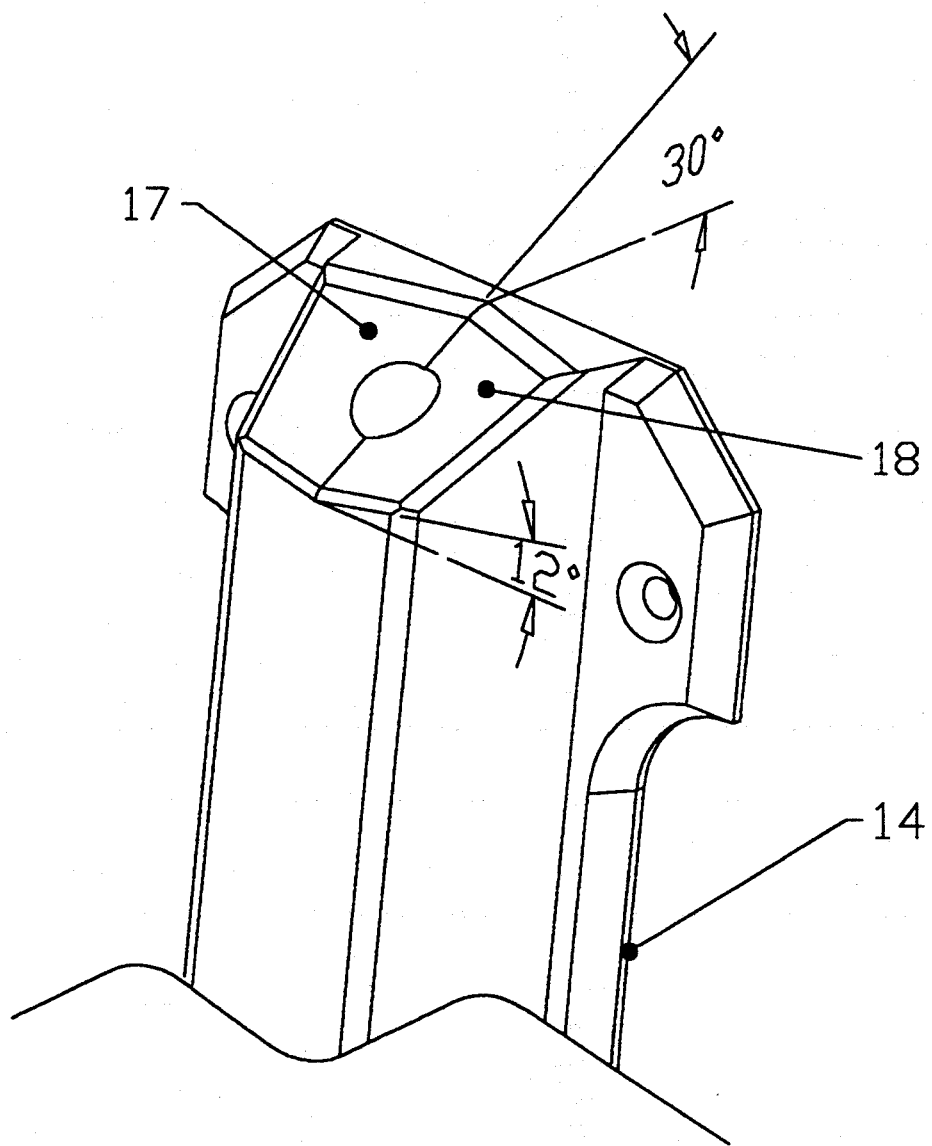
FIG. 7 is a detailed view of the post bracket.

FIG. 7 is a detailed view of the post bracket. Surfaces 17 and 18 of post bracket 14 are set at predetermined angles to achieve the correct pivoting characteristics. As seen in FIG. 7, surfaces 17 and 18 are set at 12 degrees above horizontal (the plane of the road) and tilted upwards at 30 degrees from horizontal. This preferred compound angle design controls the pivoting movement of the device. This preferred compound angle combination is also mirrored on the box support 13 surfaces 20 & 21 as noted above.

The 12 degree angle or return angle controls the precision of the centering achieved when the support mechanism is struck and attempts to return to its original position. If this angle was 0 degrees, the device could possibly not return to its original position. This angle could vary anywhere from 5 to 45 degrees but the steeper the angle also means the harder the support mechanism must be struck in order to move it and also the more stresses invoked into the bearing 28, thrust washer 32, shaft 24 and castings 13 & 14.

The 30 degree angle or speed angle controls the speed at which the device returns after being struck as well as contributing to the force required to pivot the mechanism. This angle also controls the amount of vertical displacement of the mailbox when pivoted and this wants to be kept to a minimum. This angle could also vary anywhere from 5 to 45 degrees yet the steeper the angle also means the faster the invention pivots on its return motion as well as increasing the force necessary to pivot the invention.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A pivoting apparatus for attaching a mailbox to a post comprising:

a box support section having at least two attachment mailbox mounting flanges that attach said support section to the mailbox, said box support section also having a top portion having a compound angled surface and a bottom portion, with said top and bottom portions having an opening;

a post bracket that is attached to the post, said bracket having a top portion having a compound angled surface and a bottom portion, with said top and bottom portions having an opening, and wherein the compound angle of said top portion of said box support section corresponds to the compound angle of said top portion of said post bracket;

a shaft having a diameter corresponding to the openings in said top and bottom portions of said box support section and corresponding to the openings in said top and bottom portions of said post bracket, said shaft pivotally connecting said box support section to said post bracket through the openings in said top and bottom portions of said post bracket and said box support section such the compound angled surfaces of said post bracket and said box support section are adjacent to one another;

a compression spring surrounding said shaft and between the top portion of said post bracket and the bottom portion of said box support section, wherein the pivoting of said box support section causes said spring to be compressed;

wherein a lateral force against said box support section causes said box support to pivot on said shaft by riding up the compound angled surface of said post bracket.

2. The pivoting apparatus of claim 1 wherein said box support section further comprises a stop support that positions the mailbox at a distance from the post such that said box support section can pivot at least 90 degrees in either direction without the attached mailbox hitting the post.

3. The pivoting apparatus of claim 2 wherein said box support section further comprises an integral hook adapted to hold a newspaper.

4. The pivoting apparatus of claim 3 further comprising a thrust bearing interposed between the compound angled surface of said top portion of said box support and the compound angled surface of said top portion of said post bracket.

5. The pivoting apparatus of claim 4 further comprising a first flange bearing within the opening of said bottom portion of said post bracket and a second flange bearing with the opening of said bottom portion of said post bracket.

6. The pivoting apparatus of claim 5 wherein said thrust bearing and said first and second flange bearings are nylon.

7. The pivoting apparatus of claim 6 wherein said box support section further comprising a decorative area that can be used to provide a variety of designs.

8. The pivoting apparatus of claim 1 wherein said compound angle of said post bracket further comprises a return angle and a speed angle.

9. The pivoting apparatus of claim 8 wherein said compound angle of said box support section further comprises a return angle and a speed angle.

10. The pivoting apparatus of claim 9 wherein said return angle of said post bracket is in the range of 5 degrees to 45 degrees.

11. The pivoting apparatus of claim 10 wherein said speed angle of said post bracket is in the range of 5 degrees to 45 degrees.

12. The pivoting apparatus of claim 11 wherein said return angle of said post bracket is 12 degrees.

13. The pivoting apparatus of claim 12 wherein said speed angle of said post bracket is 30 degrees.

* * * * *